Figures 1, 2:
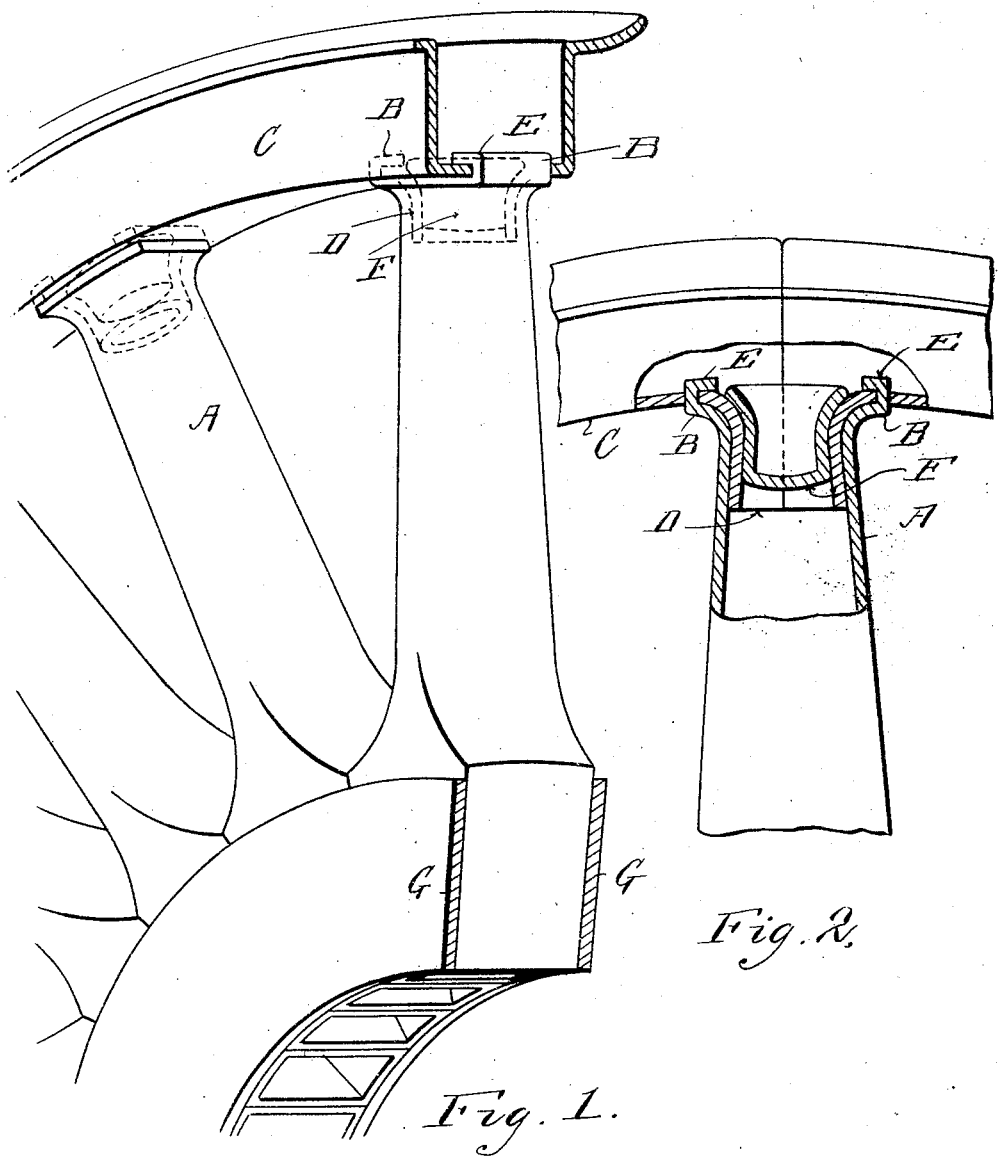

T. E. MURRAY.
METAL VEHICLE WHEEL.
APPLICATION FILED MAR. 2, 1916.

1,186,223.

Patented June 6, 1916.

Inventor
Thomas E. Murray
By his Attorney

UNITED STATES PATENT OFFICE.

THOMAS E. MURRAY, OF NEW YORK, N. Y.

METAL VEHICLE-WHEEL.

1,186,223.  Specification of Letters Patent.  Patented June 6, 1916.

Application filed March 2, 1916. Serial No. 81,587.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists in the device, hereinafter set forth, whereby the tubular metal spokes are attached to the rim. The object is to cheapen and simplify the construction.

In the accompanying drawings, Figure 1 is a perspective view, showing the rim in transverse section, with my device attached. Fig. 2 is a longitudinal section of a spoke attached to the rim, with the fastening plug in place.

Similar letters of reference indicate like parts.

The spokes A are tubular and contracted near their extremities, which are preferably rectangular, as shown. The rim C has formed, preferably integrally with it, a tubular projection D which enters the open end of the spoke, and after insertion may be expanded by any suitable tool so as closely to fit said spoke. A plug F, preferably cup-shaped, is finally driven into the projection D and expanded therein to fit said projection. If desired, the parts may be further united by spot welding.

In order to obtain additional strength, especially for wheels intended for heavy vehicles, I may provide flanges B on opposite sides of the rectangular outer ends of the spokes, and after inserting them through transverse slots in the bottom of the rim, bend them over, as shown at E.

As here shown, the inner ends of the spokes are of frusto-wedge form and placed in juxtaposition and welded between circular plates G; but the mode of securing the inner ends of said spokes is not a part of my present invention, which may be used with spokes connected to one another or to the hub in any suitable way.

I claim:

1. A metal vehicle wheel, comprising a rim having a tubular projection on its inner circumferential periphery, a tubular spoke receiving said projection at its outer end, and a plug entering said tubular projection.

2. A metal vehicle wheel, comprising a tubular spoke inwardly tapered toward its outer extremity, a rim having on its inner circumferential periphery a tubular projection fitting in said tapered spoke, and a plug entering said projection.

3. A metal vehicle wheel, comprising a tubular spoke inwardly tapered toward its outer extremity, a rim having on its inner circumferential periphery a tubular projection fitting in said tapered spoke, and a cup-shaped plug expanded in said projection.

4. A metal vehicle wheel, comprising a rim having an integral tubular projection on its inner circumferential periphery and two transverse slots adjacent to said projection, a tubular spoke having a rectangular outer extremity and a contraction in proximity to said extremity, the said rim projection fitting within said spoke, and the said spoke having on said rectangular extremity two flanges passing through said rim slots and bent over on the outer surface of said rim, and a plug entering said tubular projection.

In testimony whereof I have affixed my signature in presence of two witnesses.

THOMAS E. MURRAY.

Witnesses:
 GERTRUDE T. PORTER,
 MAY T. MCGARRY.